US006993434B2

(12) United States Patent  (10) Patent No.: US 6,993,434 B2
Cheng et al.  (45) Date of Patent: Jan. 31, 2006

(54) METHOD FOR MULTI-REGION DATA PROCESSING AND VISUALIZATION

(75) Inventors: Yao-Chou Cheng, Houston, TX (US); James E. Holl, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 91 days.

(21) Appl. No.: 10/774,317

(22) Filed: Feb. 6, 2004

(65) Prior Publication Data

US 2004/0210395 A1 Oct. 21, 2004

Related U.S. Application Data

(60) Provisional application No. 60/457,069, filed on Mar. 24, 2003.

(51) Int. Cl.
*G01V 1/28* (2006.01)

(52) U.S. Cl. .......................................... 702/16; 702/17
(58) Field of Classification Search ................. 702/16, 702/17, 6, 11, 5
See application file for complete search history.

(56) References Cited

U.S. PATENT DOCUMENTS

| 4,467,461 | A | * | 8/1984 | Rice ............................. 367/70 |
| 4,970,699 | A | * | 11/1990 | Bucker et al. ................. 367/70 |
| 2004/0098200 | A1 | * | 5/2004 | Wentland et al. ............... 702/2 |
| 2004/0210547 | A1 | * | 10/2004 | Wentland et al. ............. 706/46 |

OTHER PUBLICATIONS

U.S. Appl. No. 60/395,960, filed Jul. 12, 2002.*
U.S. Appl. No. 60/395,950, filed Jul. 12, 2002.*
Earnshaw, R. A. and Watson, D. (Ed.) (1993) "Animation and Scientific Visualization, Tools and Applications" Academic Press, ISBN 0-12-227745-7, (contents listing).
Foley, J. D. et al. (1990) "Computer Graphics" Addison-Wesley Pub. Co., 2nd Ed., ISBN 0-201-12110-7, (contents listing).
Gillie, A. C. (1965) "Binary Arithmetic and Boolean Algebra", McGraw-Hill, Inc., (contents).
CogniSeis Development, Inc. (1996) "VoxelGeo Programmer's Guide" 2.1.5, Oct. 1996, (contents).
Monk, J. D. (1969) "Introduction to Set Theory", McGraw-Hill, (contents).
T-Surf, Inc. (1995) "Gocad++ User's Manual", vol. 1, Oct. 1995, (contents).

* cited by examiner

*Primary Examiner*—Donald McElheny, Jr.
(74) *Attorney, Agent, or Firm*—ExxonMobil-URC Law Dept.

(57) ABSTRACT

A method for processing data sets is disclosed. In one embodiment, the method comprises; (a) defining at least two primary region constraints in the data sets by creating a corresponding constraint data set, (b) combining at least two primary region constraints using gated-logic expressions to create derived regions, (c) creating mapping functions from the gated-logic expressions of the derived regions, and (d) displaying desired derived regions through manipulation of the mapping functions. This method is preferably computer implemented and permits processing of multiple constraints in large data sets (such as, three-dimensional seismic or discontinuity data).

23 Claims, 3 Drawing Sheets

METHOD FOR MULTI-REGION DATA PROCESSING AND VISUALIZATION

This application claims the benefit of U.S. Provisional Patent Application No. 60/457,069 filed on Mar. 24, 2003.

FIELD OF THE INVENTION

This invention generally relates to the field of data set interpretation, processing and visualization. More particularly, this invention relates to processing, identification, and rendering of multiple regions within data sets (including three-dimensional seismic data) using a constraint data set and Boolean-logic expressions.

BACKGROUND

In hydrocarbon system evaluations, data interpretation and processing (including mapping horizons, faults and fault networks) is essential to determine the reservoirs and migration pathways from the source to the reservoir. Faults can also help trap hydrocarbons or fragment a reservoir and therefore cause complications during field production.

Data interpretation and processing commonly requires identification and/or processing of certain defined regions within the entire data set. For example, for processing geologically defined regions identification of regions constrained by horizons or faults of interest is typically required. Effective visualization of regions (or subsets) within the data set during interpretation is improved through interactive modification of region constraints, displayed opacity, and/or displayed color scale.

A sample in a three-dimensional data set can be represented by, for example, 8-bit, 16-bit or 32-bit data storage. A bit is a binary representation carrying the value of either 1 or 0. The higher the number of bits, the better the sample precision. Several methods have been used to define and process data subsets via the representation of samples in a data set.

One method requires altering the bit representation of the data sample. For example, if a three-dimensional sample belongs (or does not belong) to a particular geological region, then the bit representing this sample would be set to 1 (or 0). This method is used by many volume visualization systems, including a commercial package called Voxel-Geo™. This method allows rapid identification of a region during volume rendering and processing by checking the bits of the data samples. One disadvantage of this method is that the sample precision is reduced, since one of the bits in each sample is used for the region identifier (for example, 8-bit sample reduced to 7-bit). Another limitation is that only one region can be represented at a time. This limitation requires that for a second region to be analyzed, a time-consuming reprocessing of the entire data set in order to reset the bits according to the new region's constraints is required.

A second method, also used by commercially available products (such as, Gocad™), is to represent the region using a separate three-dimensional data volume (called a bit volume) with the same dimensionality as the original. The number of bits at each point in the bit volume depends on the size of the data storage. This bit volume uses one bit at each sample location to indicate region membership of the sample in the corresponding data set. Therefore, 8-bit data can indicate membership of up to eight different regions. This method can identify a region during volume rendering and processing. Volume rendering techniques utilize the graphic device's texture memory and display engine on a computer station to display three-dimensional volumetric information. Most volume rendering techniques employ texture memory transfer functions, which assign colors (red, green and blue), and opacity values to each data element of a given data set. The method requires checking the bit in the bit volume and processing the corresponding data sample from the original data volume.

The second method differs from the first method as different bit volumes can represent different regions without modification of the original data sample. Applying gated-logic (or Boolean-logic) constraints to several bit volumes can derive a new bit volume that characterizes all the previous bit volumes as one bit volume. Boolean-logic is a form of symbolic logic, which provides a mathematical procedure for manipulating logical relationships in symbolic form. This method allows multiple geological regions to be created. However, each new bit volume derived by application of gated logical operations to existing constraints requires expensive computational time and data storage.

Currently, to identify regions of interest (such as, regions constrained by horizons or faults of interest) in seismic volumes requires a time-consuming processing step to "sculpt" the data volumes. Sculpting currently requires use of individual bits to control the processing or rendering of a region. Combining multiple constraints (such as horizons or faults) requires the reprocessing of the entire volume using Boolean-logic to individually check each region's constraint. Modifying region constraints or creating regions based on the combination of multiple constraints, with current technology, requires vast amounts of computational resources, especially in large three-dimensional data sets. Accordingly, there is a need for an efficient and flexible way to interactively handle regions defined by multiple constraints and to apply Boolean-logic to these regions for interpretation and visualization applications.

SUMMARY

A method for processing data sets is disclosed. In one embodiment, the method comprises: (a) defining at least two primary region constraints in the data sets by creating corresponding constraint data set, (b) combining at least two primary region constraints using Boolean-logic expressions to create derived regions, (c) creating truth tables from Boolean-logic expressions of the derived regions, and (d) displaying desired derived regions through the creation and manipulation of mapping functions.

DETAILED DESCRIPTION

In the following detailed description, the invention will be described in connection with its preferred embodiments. However, to the extent that the following description is specific to a particular embodiment or a particular use of the invention, this is intended to be illustrative only. Accordingly, the invention is not limited to the specific embodiments described below, but rather, the invention includes all alternatives, modifications, and equivalents falling within the true scope of the appended claims.

This invention facilitates rapid identification of multiple, dynamic geological regions within data sets using a multi-constraint mapping method with more efficient volume processing (such as, three-dimensional data seismic volume processing). Constraints are conditions for choosing the data elements in which desired areas-of-interest can be identified. The inventive method replaces current technology by packing multiple constraints into a data set and creating a set of dynamic mapping functions for use during visualization, processing and interpretation of data (for example, manipulation of seismic data). Due to the large amount of data in most data sets, the inventive method most likely will be computer implemented to permit processing of the data sets.

Figure 1:
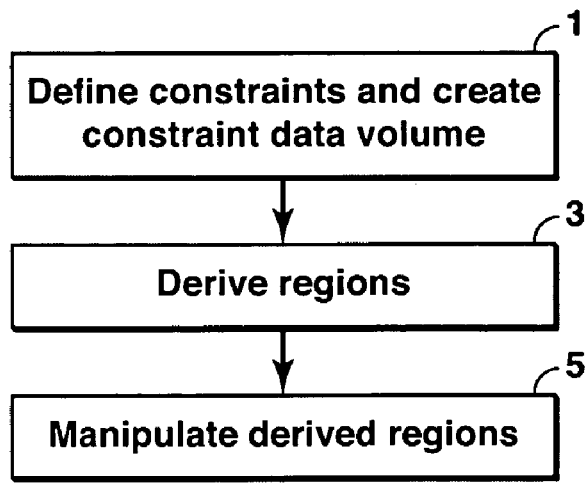
FIG. 1 is a graphical flow chart of a broad description of the invention.

As shown in FIG. 1 a broad description of the invention requires three elements. First, at least two primary region constraints in the data set are defined by creating a corresponding constraint data set 1. Second, derived regions are defined from primary regions. 3. Third, derived regions are manipulated through use of the mapping functions 5.

Figure 2:
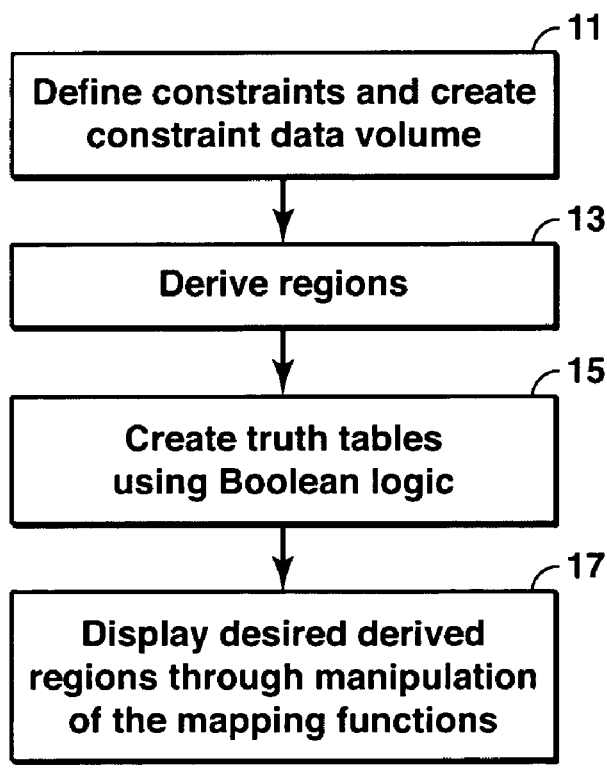
FIG. 2 illustrates a flow chart of a first embodiment of the invention.

An embodiment of the method is illustrated in FIG. 2 will now be described. First, as shown as step 11 of FIG. 2, constraints are defined by selecting at least two primary region geological/geophysical constraints, (such as, amplitude ranges, fault zones, wells, seismic attributes) in a given data set (such as, three-dimensional seismic data). Each constraint defines an area-of-interest (primary region) in the given data set.

A separate data volume called a constraint volume is created from a given data set (such as, three-dimensional data volume). Each constraint volume consists of a corresponding n bits data space (called constraint data element). "n" represents the size of the data (such as 8-bit or 16-bit data). For example, if a data element is in the 7th region of data set A, the corresponding 7th bit in the constraint data element A' is set to true (1), otherwise it is set to false (0). The combined created constraint data elements are called a constraint data set (or constraint volume). This constraint volume provides the space and structure to represent multiple primary region constraints from the original data set.

Each data element (such as, voxel points) in the constraint volume uses multiple bits. The number of bits is determined by the maximum number of primary constraints to be monitored. Each bit at each data value in the constraint volume indicates primary region membership status of the corresponding data sample in the original data set. The value in each bit is either a 1 or 0. A (1 or 0) in a certain bit location indicates that the data sample satisfies (or does not satisfy) a particular constraint (such as, proximity to horizon of interest). For example, an 8-bit constraint volume allows the user to monitor eight independently defined geological constraints. A data value of 00001101 (using bit notation counting from right) in this constraint volume indicates the corresponding data sample in the original data volume are in primary regions 1, 3 and 4 (bit 1, 3 and 4 respectively).

A constraint volume is created to monitor all primary region controls. This constraint volume together with interactively-defined look-up tables permits efficient manipulation of all regions derived from the primary regions (herein referred to as "derived regions") using Boolean-logic expression of the primary regions.

As shown in FIG. 2, the next step is to create derived regions 13. In this embodiment Boolean-logic expressions are used to combine primary regions constraints and define derived regions. A derived region is a sub-data set derived by a series of set operations (UNION, INTERSECTION, NOT, DIFFERENCE, etc.) from a group of given sub-data sets (primary regions). All samples satisfying a Boolean-logic expression of combined constraints (AND, OR, NEGATE, XOR, etc.) could be determined by applying a series of set-theory based operations using set operations on the corresponding primary regions.

In set theory, the notion of set is a collection of data elements. Given two sets A and B, A is a subset of B if every data element in A is also in B. In set theory, operators are used for arbitrary sets A, B. A UNION B: is the set consisting of data elements either in A or B. A INTERSECTION B: is the set consisting of data elements both in A and B. NOT A: is the set consisting of data elements not in A. A MINUS B: is the set of data elements in A but not in B (that is, A MINUS B is equivalent to A INTERSECTION (NOT B)).

In other words, a derived region defined by Boolean-logic expressions of combined constraints can be expressed as set-based operations from their corresponding primary regions. For example, a derived region defined by the Boolean-logic expression, C1 AND C2 AND C4, can be determined by the intersection of regions R1, R2 and R4. (Where R1, R2 and R4 are the primary regions defined by C1, C2 and C4 respectively). In the case of monitoring eight primary regions, all of the data values in the constraint volume with the exact notation of 00001101 will be included in this combined derived volume. Likewise, a derived region defined by the Boolean-logic expression, C1 OR C2 OR C4 can be determined by the union of regions R1, R2 and R4. A data sample in the constraint volume having the bit value 1 in any one of the bit positions 1, 3 or 4 would be included in this derived region.

Referring to FIG. 2, step 15, look-up tables are created in the form of truth tables to increase the interactivity of derived region manipulation within a particular data volume. The validity of every Boolean-logic statement can be determined for each sample in a data volume each time the regions are manipulated. Representing all the primary constraints in a constraint data set and converting the Boolean-logic statement to a truth-table avoids the time-consuming process of determining derived region membership by way of checking the validity of Boolean-logic statement for every data sample.

The truth table represents the validity (true or false) of a particular logic expression for all possible bit notations. The underlining premise of Boolean-logic is set theory. The Boolean operators and their relations to the set operations are as follows: The AND operator is equivalent to the set INTERSECTION operation, The OR operator is equivalent to the set UNION operation, The NEGATION operation is equivalent to the set NOT operation. As shown in Tables 1, 2, and 3, the Boolean operation over operator AND, OR and NEGATION are defined by truth tables as follows (the binary notation 0 and 1 are also denoted).

TABLE 1

| A | B | A AND B |
|---|---|---|
| True (1) | True (1) | True (1) |
| True (1) | False (0) | False (0) |
| False (0) | True (1) | False (0) |
| False (0) | False (0) | False (0) |

TABLE 2

| A | B | A OR B |
|---|---|---|
| True (1) | True (1) | True (1) |
| True (1) | False (0) | True (1) |
| False (0) | True (0) | True (1) |
| False (0) | False (0) | False (0) |

TABLE 3

| A | NOT A |
|---|---|
| True (1) | False (0) |
| False (0) | True (1) |

The final step, as shown in FIG. 2, is to display the desired derived regions through manipulation of the mapping functions 17. As described above, mapping functions are created in the form of look-up tables to increase the interactivity of derived region manipulation within a particular data volume. For a constraint volume monitoring N primary regions, the mapping function consists of a total of 2 to the power of N entries. For example, in the case of monitoring 8 primary regions, a mapping function (F), can simply be a look-up table with 256 (2 to the power of 8) entries. A derived region defined by the Boolean-logic expression, C1 AND C2 AND C4 can be expressed by a membership function F with F(00001101)=1 (true) and F(0)=0 (false) for all other possible bit notations. Since the numerical value for bit notation 00001101 is 13 the derived regions can therefore be monitored by an integer function F with domain {0, 1, 2, . . . , 255} and range {0, 1}. This function can then be used to determine the membership of each data sample in the derived region simply by checking the integer value in the corresponding constraint volume. The mapping function then defines the display characteristics (for example, opacity and/or color) for each derived region during the rendering process. Use of this method provides a much quicker and more flexible means of manipulating multiple regions than is possible with conventional methods.

Three-Dimensional Modeling

Although the invention can apply to any kind of data set, a three-dimensional regular grid structure is typically used for three-dimensional seismic processing. In a regularly gridded volume each cell is the same size and represents one data sample. The sample precision of the data typically is 8 bits, 16 bits or 32 bits. In three-dimensional seismic volume, the sample values could represent amplitude or a derivative value, such as discontinuity, curvature, and facies. Typically, an 8-bit constraint volume is used to monitor the region constraints.

Different kinds of mapping functions are created to render and process the derived regions during interactive seismic interpretation sessions. For example, the color/opacity look-up tables are used as the mapping function to render the area of interests during volume sculpting and volume rendering permitting more rapid and dynamic constraint processing during an interactive interpretation session.

Fuzzy constraints (or fuzzy logic) are often utilized in the Boolean-logic expression to create the mapping function during the uncertainty analysis of multiple constraints. Fuzzy logic is an extension of the Boolean logic, in which the process to handle the concept of partial truth can be enabled. Fuzzy logic was introduced as a means to model the uncertainty and is well known to persons skilled in the art. It is the theory used in logic expression to handle the approximate rather than exact. The fuzzy logic expressions are used here to extend the Boolean logic expressions.

The derived regions can then be expressed based on the intermediate degrees of membership in the primary regions. Unlike Boolean logic that uses 1 and 0 to represent TRUE and FALSE, a real-value between 1 and 0 is used to express the possibility of lying in between. For example, a derived region with the constraints of possibility of in region C1 is 0.9 (very high), possibility of in region C2 is 0.2 (very low) and possibility of in region C4 is 1 (very certain) can be expressed as a Fuzzy logic expression of ((C1, 0.9) AND (C2, 0.2) AND (C4, 1)). The mapping function can thus be created based on the result evaluated from the expression as we did for Boolean logic expression.

EXAMPLES

Figure 3:
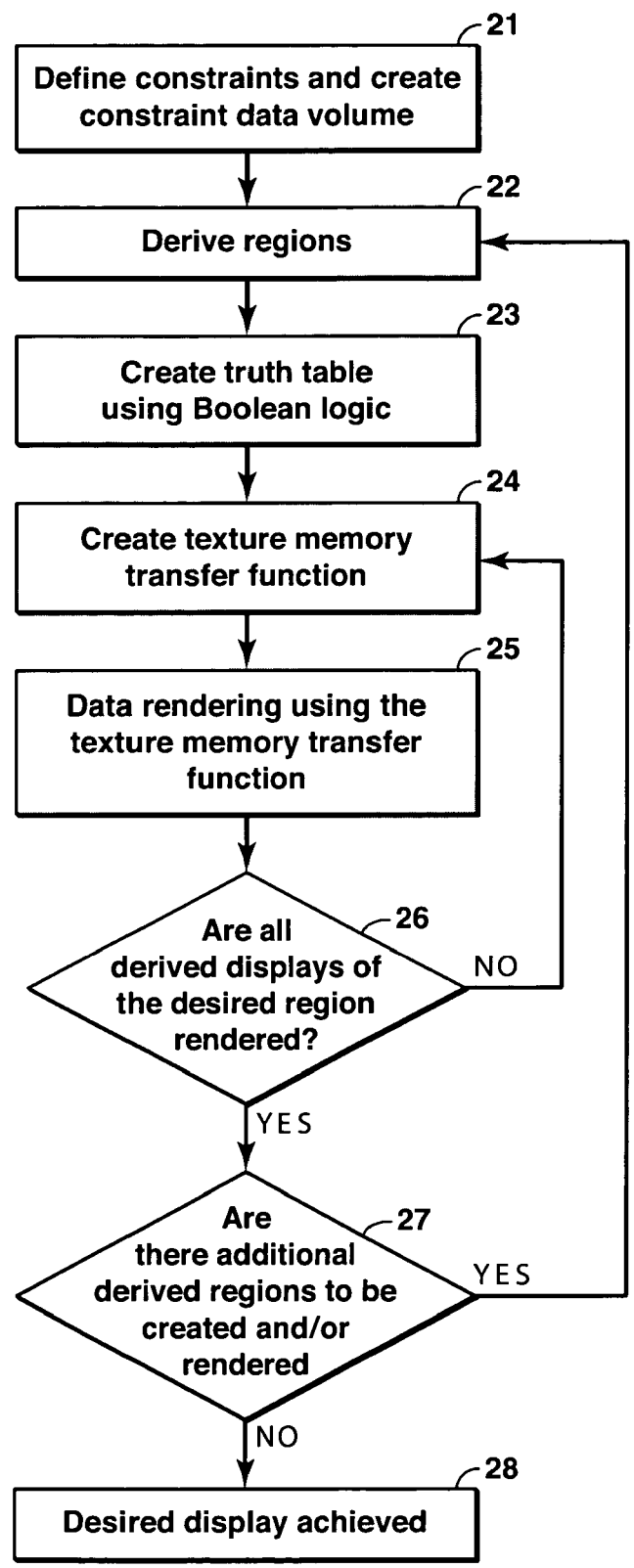
FIG. 3 illustrates a flow chart of a second embodiment of the invention.

As shown in FIG. 3, one embodiment requires seven steps for manipulating and/or processing a group of primary regions. First, at least one constraint data set is created from given data sets and given primary regions 21. The operator defines N primary regions A1, A2, A3, . . . , $A_N$ in a given data set D. For each data element in the data set D, a corresponding N-bit data storage (called constraint data element) is also created. If a data element is in the i-th region Ai, the corresponding i-th bit in the constraint data element is set to True (1), otherwise it is set to False (0). All the created constraint data elements are considered a constraint data set (constraint volume).

The second step, requires the operator to define derived regions using logic expressions 22. As described above, the operator composes a derived region using a series of set operations. For example, set expression ((A1 Union A2) Intersection A3) indicates that the derived region consists of data elements in region A1 or A2, which are also in region A3.

The third step uses Boolean-logic to create a truth table for the specified logic expression 23. Boolean-logic expressions are a simple, flexible and logic way for user to express the derive regions. In this example, assume N is 3. That is each data element in the constraint data set has 3 bits. A value of 0 or 1 in the first bit location represents the membership of the corresponding data element in the region A1, a value of 0 or 1 in the second bit location represents the membership of the corresponding data element in the region A2, and a value of 0 or 1 in the third bit location represents the membership of the corresponding data element in the region A3. As shown in Table 4, a 3-bit data element can have 8 possible bit combinations. Given the example set expression, ((A1 Union A2) Intersection A3), a truth table is created using Boolean-logic to represents the gated-logic expression: ((A1 OR A2) AND A3). In this example a data element would have membership in the derived region in the following cases as shown in Table 4:

TABLE 4

| 3-Bit Binary Value | Membership |
|---|---|
| 000 | False |
| 001 | False |
| 010 | False |
| 011 | True |
| 100 | False |
| 101 | True |
| 110 | False |
| 111 | True |

Truth tables can then be used to create mapping functions for the volume rendering process. The mapping functions are created to define the display settings (for example, opacity and color) for the derived regions. Once defined, the operator can then choose from the mapping functions utilizing a pre-defined interface without using gated-logic expressions. In this example, data elements in primary region A1 and A3 (with a binary value of 111) will be displayed with half-transparent (0.5) opacity and shown in green. Data elements in A1 and A3 but not in A2 (with a binary value of 101) will be displayed in green with whole opacity (1). Data elements in A2 and A3 but not in A1 (binary value of 011) will be displayed in red with whole opacity (1). The color or opacity is arbitrarily chosen by the operator to highlight regions or features of interest.

TABLE 5

| 3-Bit Binary Value | Membership | Opacity Value | Color |
|---|---|---|---|
| 000 | False | 0 | |
| 001 | False | 0 | |
| 010 | False | 0 | |
| 011 | True | 1 | red |
| 100 | False | 0 | |
| 101 | True | 1 | blue |
| 110 | False | 0 | |
| 111 | True | 0.5 | green |

The fourth step is to create a texture memory transfer function 24. Similar to most of the multi-volume co-rendering prior art methods, the transfer function used in this embodiment assigns color and opacity to the texture memory based on the values of the data elements from multiple volumes. However, unlike those methods, the constraint volume mapping function (defined by the user based on the Boolean-logic truth-table) is combined with the mapping function defined for the original data set to produce the final texture memory transfer function. This allows a much more flexible region control display in which the rendering of the derived regions in the computer display devices can be manipulated quickly without altering the values of the affected data elements in the given data sets.

The fifth step is a data rendering process using the texture memory transfer function 25. During the volume rendering operations, the data values to be displayed are taken from the original data set D. The control of the display in terms of the color and opacity depends on the constraint data set and the mapping functions created in the previous step. Therefore, in this method, extra control bit-volumes are not necessary for each derived region and the data elements in the constraint data set do not need to be modified.

The sixth step is to repeat the previous step for all the different displays using modified look-up tables 26. On the seventh step, the operator, if additional derived regions are desired, repeats the last three steps to obtain and manipulate a new derived region using gated-logic expression of primary regions 27. The process is repeated until the final step of displaying a desired display is achieved 28. After the desired displayed is achieved, the operator can perform additional rendering and processing of the data. Techniques for rendering and processing of displayed data are well know to persons skilled in the art. The operator may choose to use the mapping functions to simplify the technique of rendering and processing the data.

Figure 4:
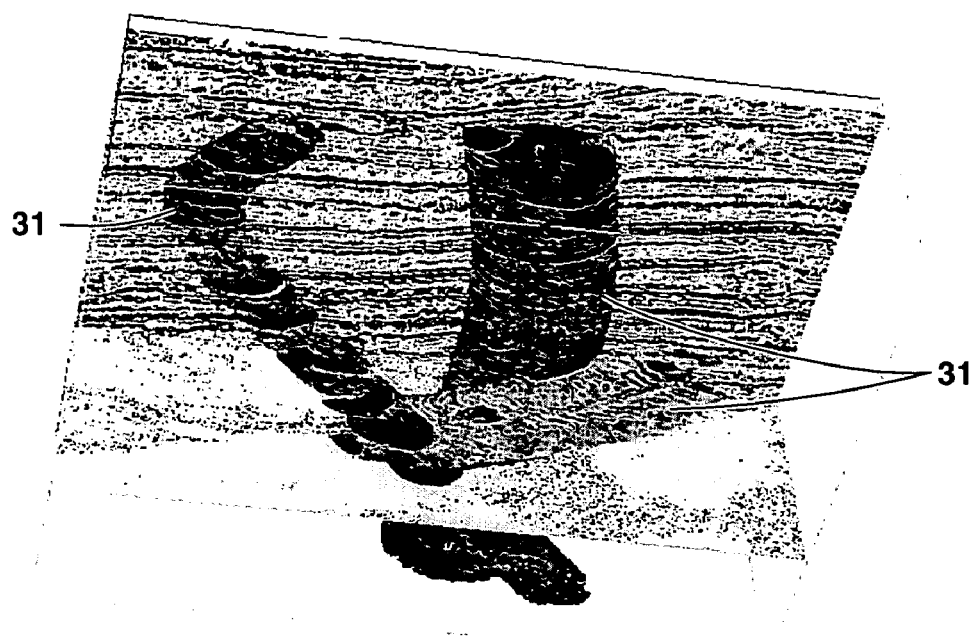
FIG. 4 illustrates three geological regions and their derived regions rendered in different colors and opacity using color and opacity mapping functions from seismic amplitude and discontinuity data.

A test of the invention was performed to illustrate volume rendering, volume sculpting and horizon tracking processing. As shown in FIG. 3 the invention permits manipulating multiple geological regions using two mapping functions, one for color control (not shown), another for opacity control during interactive interpretation session. In FIG. 4, three geological regions 31 and their derived regions are rendered in different colors (not shown) and opacity using color and opacity mapping functions from seismic amplitude and discontinuity data. The mapping allows user to interactively control the rendering properties of the primary and derived regions.

Figure 5:
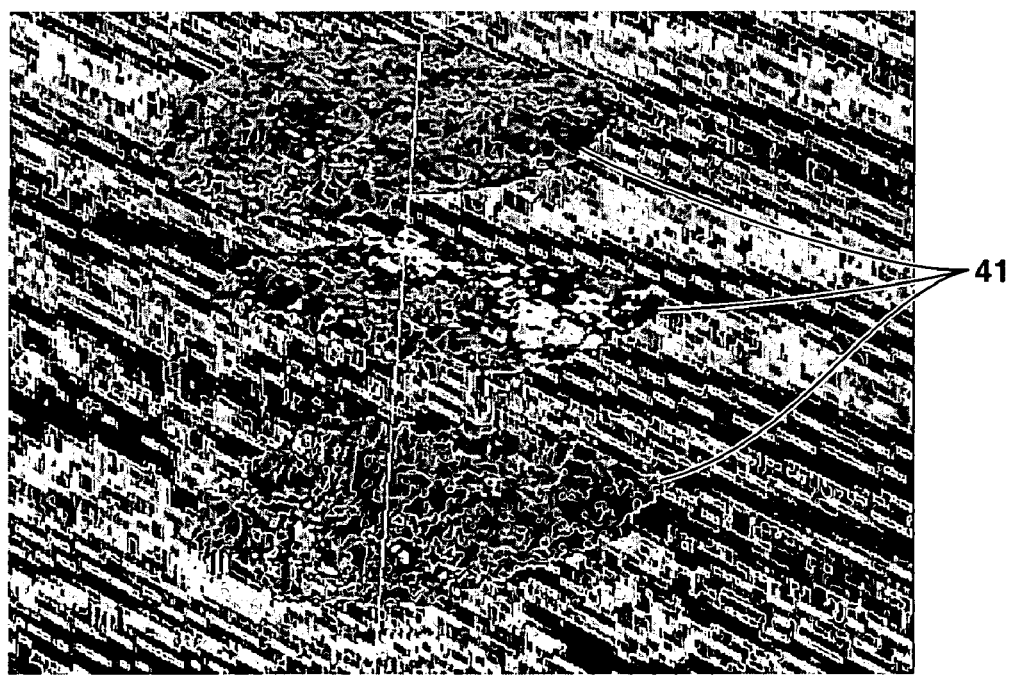
FIG. 5 illustrates three detected horizons in the well region detected and displayed with a seismic session using the present invention.

In another example, as shown in FIG. 5, mapping functions were used as a set of conditions to dynamically limit the searching processes in an interactive horizon detection session. FIG. 5, illustrates three horizons 41 detected in the well region and displayed with a seismic session using the present invention.

What is claimed is:

1. A method for processing data sets, the method comprising:
    (a) defining at least two primary region constraints in the data sets by creating a corresponding constraint data set;
    (b) combining at least two primary region constraints using Boolean-logic expressions to define derived regions;
    (c) creating mapping functions from Boolean-logic expressions of the derived regions;
    (d) displaying desired derived regions through manipulation of the mapping functions.

2. The method of claim 1 wherein the primary region constraints are defined by creating constraint values, wherein the constraint values are sufficient to provide the space and structure to represent a desired number of derived regions.

3. The method of claim 1 wherein the data sets represents seismic data.

4. The method of claim 1 wherein the data sets represents seismic amplitude.

5. The method of claim 1 wherein the data sets represents a derivative value of seismic amplitude.

6. The method of claim 5 wherein the derivative value of seismic amplitude is discontinuity.

7. The method of claim 5 wherein the derivative value of seismic amplitude is curvature.

8. The method of claim 5 wherein the derivative value of seismic amplitude is facies.

9. The method of claim 1 wherein processing conditions are used as the mapping function.

10. The method of claim 1 wherein fuzzy constraints are used as the mapping functions.

11. The method of claim 1 wherein the data sets are three-dimensional data volumes.

12. The method of claim 1 wherein the method is computer implemented.

13. The method of claim 1 further comprising performing a data set rendering process, wherein the mapping function of step (c) is used for rendering a data set in the derived region.

14. The method of claim 13 further comprising volume sculpting and volume rendering wherein the mapping function of step (c) is used to render defined primary regions during volume sculpting and volume rendering.

15. The method of claim 13 further comprising processing of the data set during the rendering process.

16. A method for processing data sets, the method comprising:
   (a) defining at least two primary region constraints in the data sets by creating corresponding constraint data set;
   (b) combining at least two primary region constraints using Boolean-logic expressions to define derived regions;
   (c) creating mapping functions from the Boolean-logic expressions of the derived regions;
   (d) performing a data set rendering process, wherein the mapping function of step (c) is used in rendering a data set in the derived region;
   (e) repeating step (d) until all displays of a derived regions that are desired to be rendered are rendered;
   (f) repeating steps (b) through (e) until all desired derived regions are created and rendered; and
   (g) displaying desired derived regions.

17. The method of claim 16 wherein the method is computer implemented.

18. The method of claim 16 wherein the data sets are seismic amplitude data.

19. The method of claim 16 wherein the data sets represents a derivative value of seismic amplitude.

20. The method of claim 16 wherein the data sets are three-dimensional data sets.

21. The method of claim 16 further comprising processing of the data set during the rendering process of step (d).

22. The method of claim 16 wherein the displayed derived regions are further rendered after the derived regions are displayed.

23. The method of claim 16 wherein the mapping function of step (d) is used to create a texture memory transfer function and the data is rendered using the texture memory function.

* * * * *